United States Patent
Smiddy et al.

(10) Patent No.: US 10,689,997 B2
(45) Date of Patent: Jun. 23, 2020

(54) SEAL ASSEMBLY FOR GAS TURBINE ENGINE

(71) Applicant: United Technologies Corporation, Farmington, CT (US)

(72) Inventors: Winston Gregory Smiddy, Saco, ME (US); Paul M. Lutjen, Kennebunkport, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 154 days.

(21) Appl. No.: 15/955,585

(22) Filed: Apr. 17, 2018

(65) Prior Publication Data

US 2019/0316480 A1 Oct. 17, 2019

(51) Int. Cl.
*F01D 11/08* (2006.01)
*F02C 7/28* (2006.01)

(52) U.S. Cl.
CPC ............... *F01D 11/08* (2013.01); *F02C 7/28* (2013.01); *F05D 2220/32* (2013.01); *F05D 2240/11* (2013.01); *F05D 2260/201* (2013.01); *F05D 2300/6033* (2013.01)

(58) Field of Classification Search
CPC ...... F01D 11/08; F01D 25/24; F05D 2240/11; F05D 2260/201
See application file for complete search history.

(56) References Cited

U.S. PATENT DOCUMENTS

| 4,497,610 A | * | 2/1985 | Richardson | F01D 9/04 415/116 |
| 5,486,090 A | * | 1/1996 | Thompson | F01D 11/08 415/173.1 |
| 5,738,490 A | * | 4/1998 | Pizzi | F01D 11/08 415/139 |

(Continued)

FOREIGN PATENT DOCUMENTS

EP 3214274 9/2017

OTHER PUBLICATIONS

European Search Report for European Patent Application No. 19169528.7 completed Jul. 18, 2019.

*Primary Examiner* — Kenneth J Hansen
*Assistant Examiner* — Jackson N Gillenwaters
(74) *Attorney, Agent, or Firm* — Carlson, Gaskey & Olds, P.C.

(57) ABSTRACT

A seal assembly for a gas turbine engine according to an example of the present disclosure includes, among other things, a seal that has a seal body having a sealing portion that extends from an engagement portion. The sealing portion has a seal face that extends circumferentially between first and second mate faces. The seal body defines an internal cavity that extends circumferentially between the first and second mate faces, and the engagement portion has an impingement face opposite the seal face that defines a plurality of apertures to the internal cavity. A housing is mounted to the seal such that the impingement face is exposed to define a plenum between the housing and the (Continued)

impingement face. The housing defines a plurality of cooling passages, and each of the plurality of cooling passages define a passage axis that is oriented such that a projection of the passage axis intersects the seal body. A method of sealing is also disclosed.

18 Claims, 5 Drawing Sheets

(56) References Cited

U.S. PATENT DOCUMENTS

| | | | | |
|---|---|---|---|---|
| 6,932,566 B2* | 8/2005 | Suzumura | | F01D 11/08 |
| | | | | 415/135 |
| 7,063,503 B2* | 6/2006 | Meisels | | F01D 25/24 |
| | | | | 415/116 |
| 7,306,424 B2* | 12/2007 | Romanov | | F01D 11/08 |
| | | | | 415/115 |
| 7,434,670 B2 | 10/2008 | Good et al. | | |
| 8,061,979 B1 | 11/2011 | Liang | | |
| 8,246,299 B2* | 8/2012 | Razzell | | F01D 11/005 |
| | | | | 415/173.1 |
| 8,596,963 B1* | 12/2013 | Liang | | F01D 11/12 |
| | | | | 29/889.22 |
| 8,834,105 B2 | 9/2014 | Albers et al. | | |
| 9,145,779 B2* | 9/2015 | Joe | | F01D 9/04 |
| 2004/0047726 A1* | 3/2004 | Morrison | | F01D 9/04 |
| | | | | 415/116 |
| 2008/0206042 A1* | 8/2008 | Lee | | F01D 5/143 |
| | | | | 415/116 |
| 2011/0182724 A1 | 7/2011 | Koyabu et al. | | |
| 2012/0292856 A1* | 11/2012 | Pelletier | | F01D 9/04 |
| | | | | 277/345 |
| 2014/0023490 A1 | 1/2014 | Hillier | | |
| 2016/0084101 A1* | 3/2016 | McCaffrey | | F01D 11/14 |
| | | | | 415/173.3 |
| 2016/0097303 A1 | 4/2016 | Baldiga et al. | | |
| 2016/0208645 A1* | 7/2016 | Tholen | | B22C 9/103 |
| 2016/0290144 A1* | 10/2016 | Roussille | | F01D 9/04 |
| 2016/0333741 A1 | 11/2016 | Stapleton | | |
| 2016/0376921 A1 | 12/2016 | O'Leary et al. | | |

* cited by examiner

SEAL ASSEMBLY FOR GAS TURBINE ENGINE

BACKGROUND

This disclosure relates to sealing for adjacent components of a gas turbine engine.

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged in an array. The arc segments are exposed to relatively hot gases in the gas flow path and may be configured to receive cooling airflow to cool portions of the shrouds.

SUMMARY

A seal assembly for a gas turbine engine according to an example of the present disclosure includes a seal that has a seal body having a sealing portion that extends from an engagement portion. The sealing portion has a seal face that extends circumferentially between first and second mate faces. The seal body defines an internal cavity that extends circumferentially between the first and second mate faces, and the engagement portion has an impingement face opposite the seal face that defines a plurality of apertures to the internal cavity. A housing is mounted to the seal such that the impingement face is exposed to define a plenum between the housing and the impingement face. The housing defines a plurality of cooling passages, and each of the plurality of cooling passages define a passage axis that is oriented such that a projection of the passage axis intersects the seal body.

In a further embodiment of any of the foregoing embodiments, the seal is made of a first material including a ceramic material, and the seal has a unitary construction.

In a further embodiment of any of the foregoing embodiments, the projection of the passage axis of at least some of the plurality of cooling passages intersects the impingement face.

In a further embodiment of any of the foregoing embodiments, the projection of the passage axis of other passages of the plurality of cooling passages intersects a respective one of the plurality of apertures.

In a further embodiment of any of the foregoing embodiments, the internal cavity extends from a first opening along the first mate face to a second opening along the second mate face.

A further embodiment of any of the foregoing embodiments includes a mounting block that has an interface portion extending from a mounting portion. The interface portion abuts the engagement portion along an interface to limit relative movement, and the mounting portion mechanically attached to the housing.

In a further embodiment of any of the foregoing embodiments, the projection of the passage axis of at least some of the plurality of cooling passages intersects a respective one of the plurality of apertures that is defined along the interface.

In a further embodiment of any of the foregoing embodiments, the interface portion has a dovetail geometry that extends through the first opening to mate with ramped surfaces of the internal cavity and bound movement of the seal relative to the mounting block.

In a further embodiment of any of the foregoing embodiments, the mounting block is a first mounting block and a second mounting block, and the interface portion of the first mounting block is received in the first opening and the interface portion of the second mounting block received in the second opening to secure the seal to the engine case.

In a further embodiment of any of the foregoing embodiments, the projection of the passage axis of at least some of the plurality of cooling passages intersects a respective one of the plurality of apertures that is defined along an interface between the mounting block and the seal body.

In a further embodiment of any of the foregoing embodiments, the seal is made of a first material including a ceramic material, and the mounting block is made of a second, different material.

In a further embodiment of any of the foregoing embodiments, the seal is made of a first material including a ceramic material, and the mounting block is made of a second material that is the same as the first material.

In a further embodiment of any of the foregoing embodiments, the seal is a blade outer air seal (BOAS).

A gas turbine engine according to an example of the present disclosure includes an engine case that extends along an engine axis, an array of blades rotatable about the engine axis, and an array of blade outer air seals distributed about the array of blades to bound a core flow path. Each of the seals includes an elongated seal body that has a seal face that faces toward the core flow path and an opposed impingement face. The seal body defines an internal cavity that extends circumferentially between opposed mate faces, and the seal body defines a plurality of apertures to the internal cavity along the impingement face. The seal is mounted to the engine case such that the impingement face is exposed. The engine case defines a plurality of cooling passages spaced apart from the impingement face, and each of the plurality of cooling passages defines a passage axis that is oriented such that a projection of the passage axis intersects the seal body of a respective one of the seals.

In a further embodiment of any of the foregoing embodiments, the projection of the passage axis of at least some of the plurality of cooling passages intersects the impingement face, and the projection of the passage axis of other passages of the plurality of cooling passages intersects a respective one of the plurality of apertures.

A further embodiment of any of the foregoing embodiments includes an array of circumferentially spaced apart mounting blocks. The mate faces of adjacent seals of the array of seals are arranged to define a plurality of intersegment gaps. Each of the mounting blocks is arranged along a respective one of the plurality of intersegment gaps and engages surfaces of the respective internal cavity of the adjacent seals, and each of the mounting blocks is mechanically attached to the engine case to limit movement of the respective adjacent seals relative to the engine case.

A method of sealing of a gas turbine engine according to an example of the present disclosure includes securing a mounting block to an engine static structure such that the mounting block is positioned along an intersegment gap between mate faces of adjacent blade outer air seals. Each of the adjacent blade outer air seals includes an elongated seal body that has a seal face that faces toward a gas path and an opposed impingement face. The seal body defines an internal cavity that extends circumferentially between opposed mate faces and defines a plurality of apertures to the internal cavity along the impingement face. The engine static structure defines a plurality of cooling passages, and each of the plurality of cooling passages defines a passage axis that is oriented such that a projection of the passage axis intersects the seal body of a respective one of the adjacent seals. The method includes ejecting cooling flow from the plurality of cooling passages such that the cooling flow impinges on surfaces of the seal body.

In a further embodiment of any of the foregoing embodiments, the projection of the passage axis of at least some passages of the plurality of cooling passages intersects the impingement face.

In a further embodiment of any of the foregoing embodiments, the projection of the passage axis of at least some passages of the plurality of cooling passages intersects a respective one of the plurality of apertures.

In a further embodiment of any of the foregoing embodiments, the projection of the passage axis of one or more of the plurality of cooling passages intersects a respective one of the plurality of apertures that is defined along an interface between the mounting block and the seal body.

The various features and advantages of this invention will become apparent to those skilled in the art from the following detailed description of an embodiment. The drawings that accompany the detailed description can be briefly described as follows.

DETAILED DESCRIPTION

Figure 1:
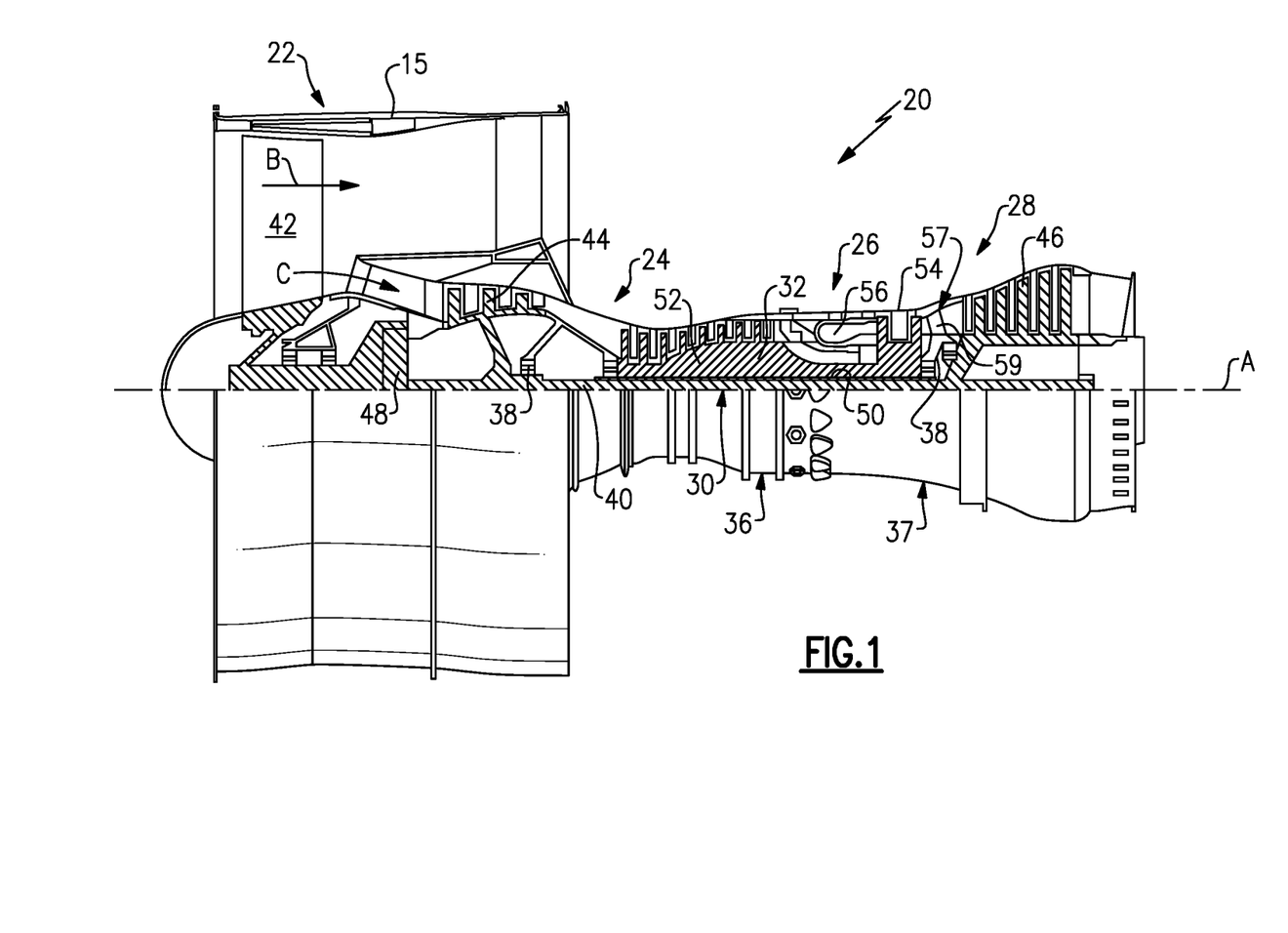
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second.

Figure 2:
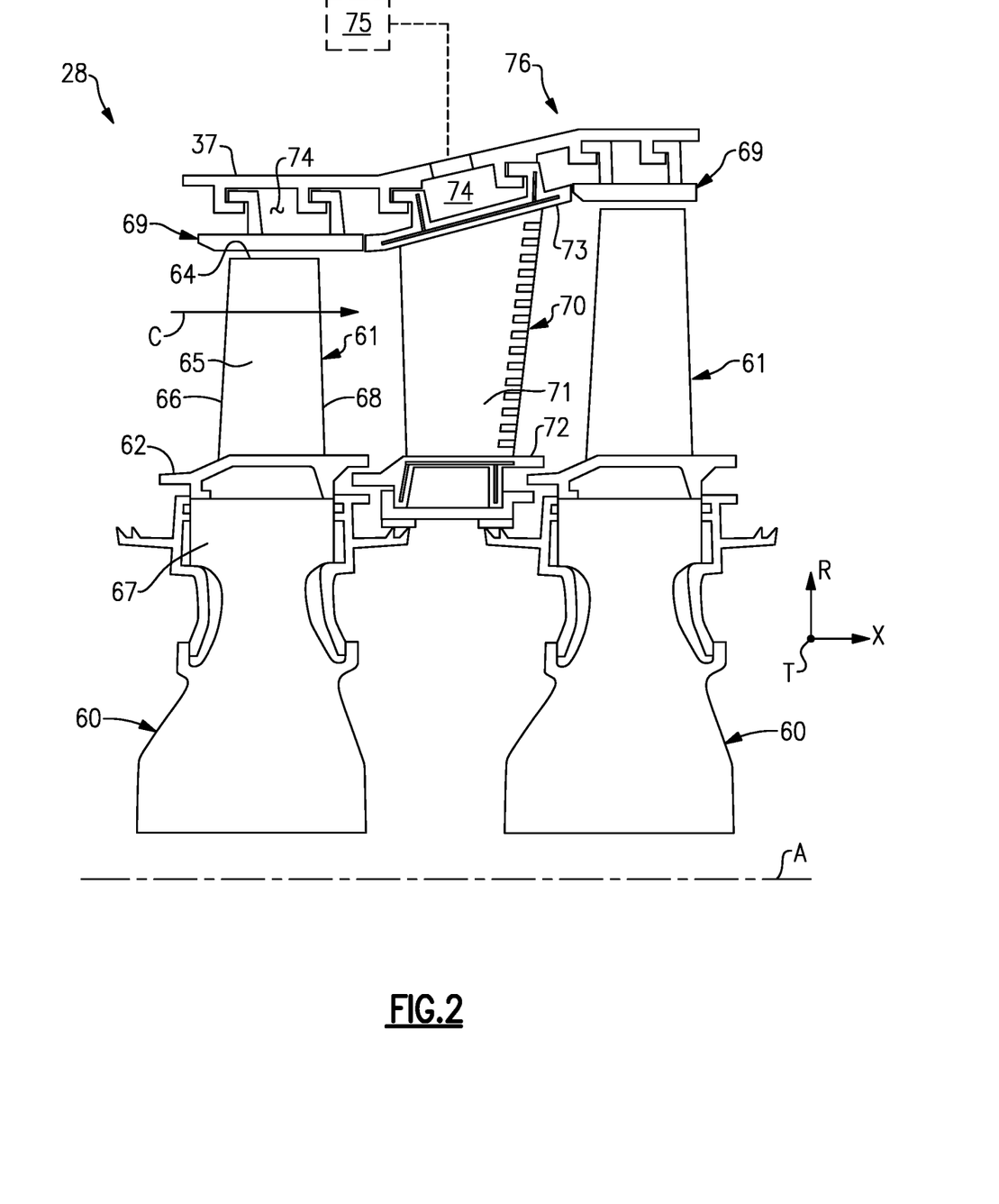
FIG. 2 shows an airfoil arrangement for a turbine section.

FIG. 2 shows selected portions of the turbine section 28 including a rotor 60 carrying one or more blades or airfoils 61 that are rotatable about the engine axis A. In this disclosure, like reference numerals designate like elements where appropriate and reference numerals with the addition of one-hundred or multiples thereof designate modified elements that are understood to incorporate the same features and benefits of the corresponding original elements. Each airfoil 61 includes a platform 62 and an airfoil section 65 extending in a radial direction R from the platform 62 to a tip 64. The airfoil section 65 generally extends in a chordwise or axial direction X between a leading edge 66 and a trailing edge 68. A root section 67 of the airfoil 61 is mounted to, or integrally formed with, the rotor 60. A blade outer air seal (BOAS) 69 is spaced radially outward from the tip 64 of the airfoil section 65. The BOAS 69 can include a plurality of seal arc segments (one shown in FIG. 3 at 169) that are circumferentially arranged in an annulus around the engine axis A. An array of the BOAS 69 are distributed about an array of the airfoils 61 to bound the core flow path C.

A vane 70 is positioned along the engine axis A and adjacent to the airfoil 61. The vane 70 includes an airfoil section 71 extending between an inner platform 72 and an outer platform 73 to define a portion of the core flow path C. The turbine section 28 includes an array of airfoils 61, vanes 70, and BOAS 69 arranged circumferentially about the engine axis A.

One or more cooling sources 75 (one shown) are configured to provide cooling air to one or more cooling cavities or plenums 74 defined by an engine static structure such as the engine case 37 or another portion of the engine static structure 36 (FIG. 1). The engine case 37 extends along the engine axis A. In the illustrated example of FIG. 2, the plenums 74 are defined between an engine case 37 and the outer platform 73 and/or BOAS 69. The engine case 37 provides a portion of the engine static structure 36 (FIG. 1) and extends along the engine axis A. The plenums 74 are configured to receive pressurized cooling flow from the cooling source(s) 75 to cool portions of the airfoil 61, BOAS 69 and/or vane 70. Cooling sources 75 can include bleed air from an upstream stage of the compressor section 24 (FIG. 1), bypass air, or a secondary cooling system aboard the aircraft, for example. Each of the plenums 74 can extend in a circumferential or thickness direction T between adjacent airfoils 61, BOAS 69 and/or vanes 70. The tips 64 of each of the airfoil sections 65 and adjacent BOAS 69 are in close radial proximity to reduce the amount of gas flow that escapes around the tips 64 through a corresponding clearance gap.

Figure 3:
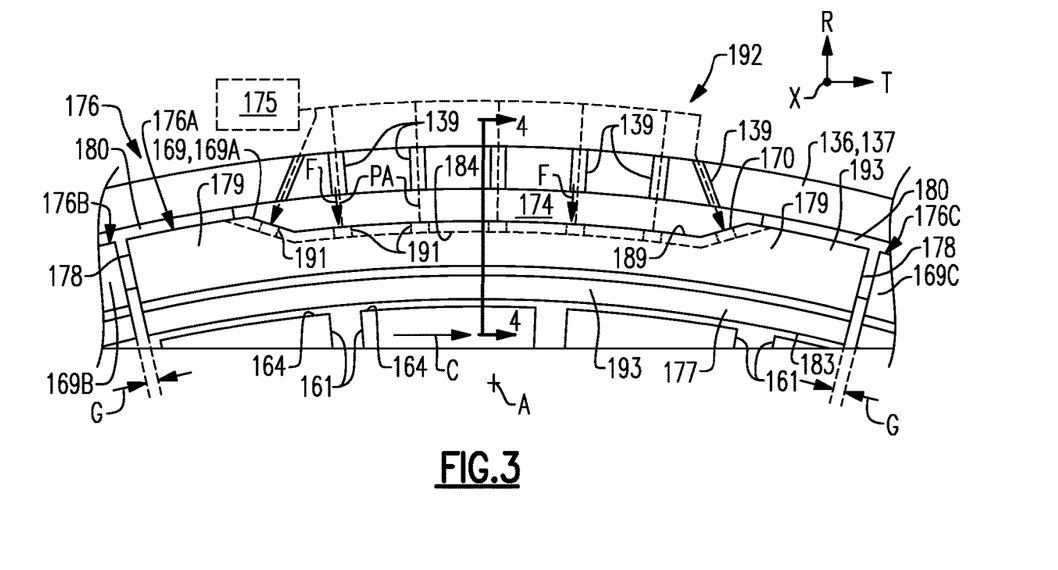
FIG. 3 illustrates an axial view of adjacent seal assemblies.
Figure 4:
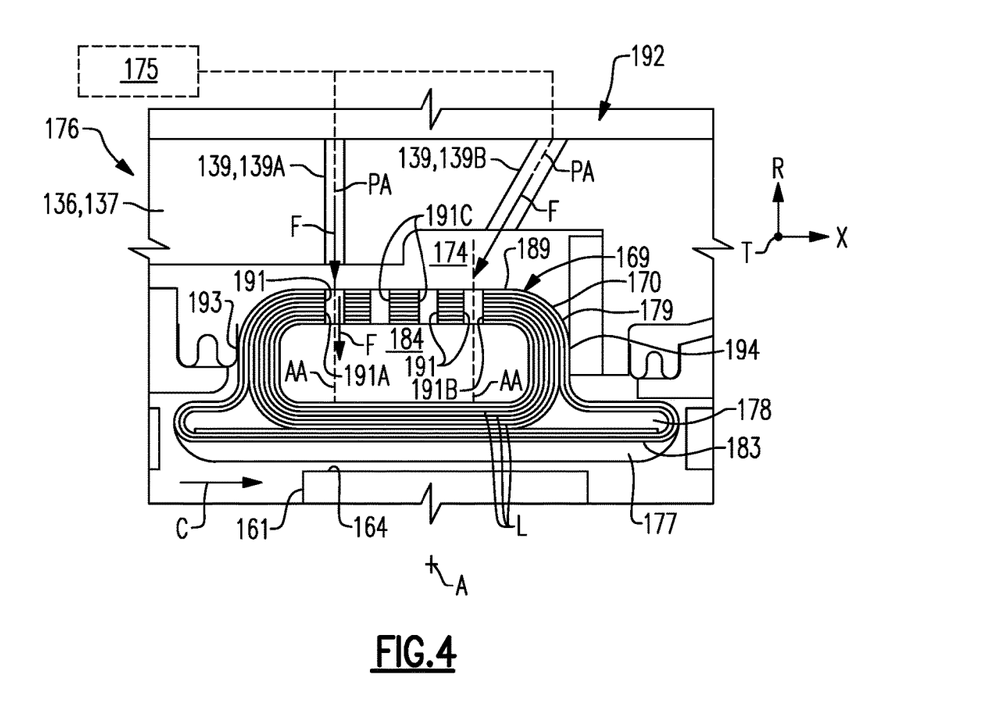
FIG. 4 illustrates a sectional view of one of the seal assemblies including a seal along line 4-4 of FIG. 3.
Figure 5:
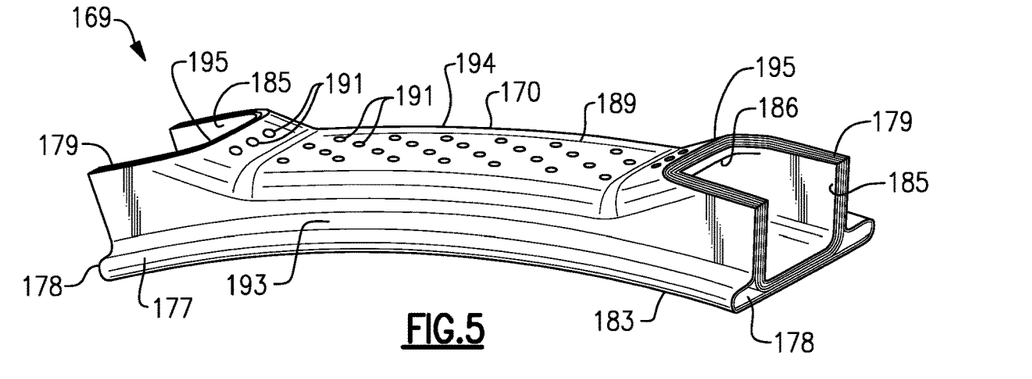
FIG. 5 illustrates an isolated perspective view of the seal of FIG. 4.
Figure 6:
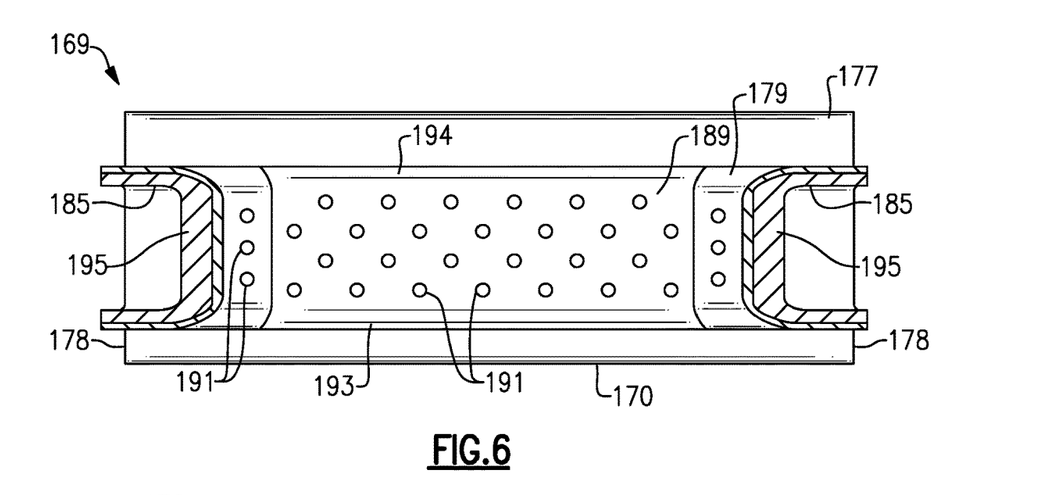
FIG. 6 illustrates a plan view of the seal of FIG. 4.
Figure 7:
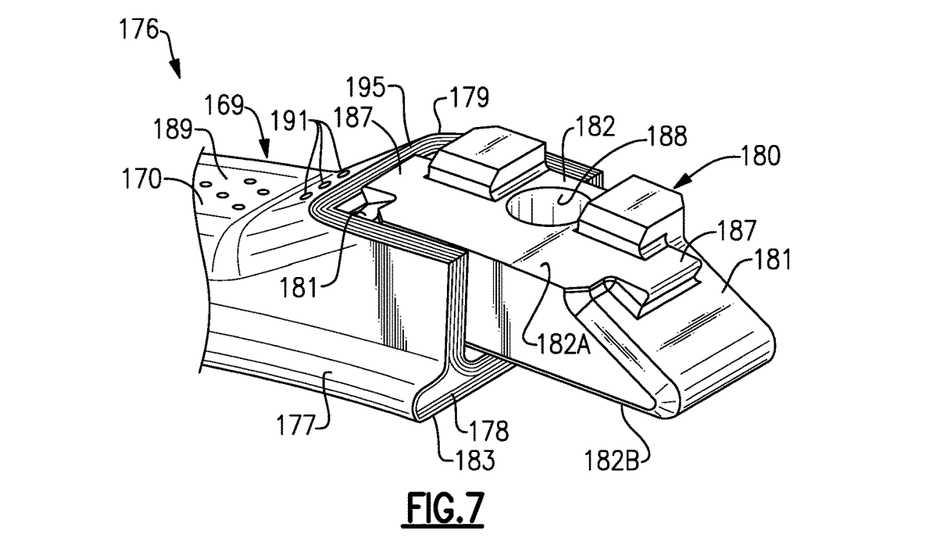
FIG. 7 illustrates a perspective view of a support inserted into the seal of FIG. 4.
Figure 8:
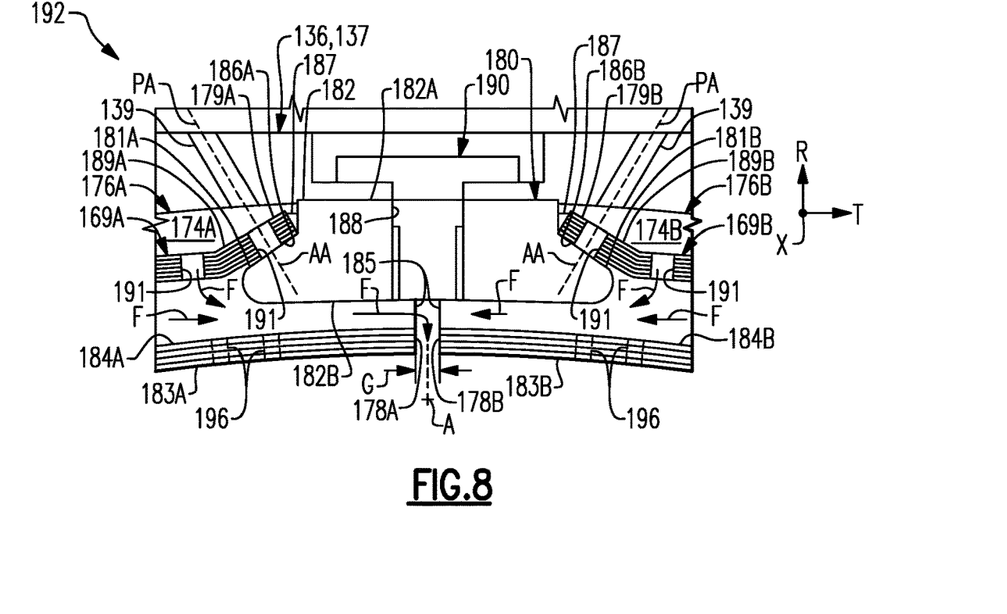
FIG. 8 illustrates a sectional view of the support of FIG. 7 between two adjacent seals.

FIGS. 3-8 illustrate an exemplary seal assembly 176 for sealing portions a gas turbine engine. The seal assembly 176 can be utilized for the seal assembly 76 of FIG. 2 or incorporated into a portion of the engine 20 of FIG. 1, for example. In the illustrated example of FIGS. 3-8, the seal 169 is a blade outer air seal (BOAS). FIG. 3 is an axial view of adjacent seal assemblies 176 (indicated as 176A, 176B, 176C). FIG. 4 is sectional view of one of the seal assemblies 176 in an installed position. FIGS. 5 and 6 illustrate perspective and plan views of the seal 169. FIG. 7 illustrates a support or mounting block 180 of the seal assembly 176 inserted into the seal 169. FIG. 8 illustrates a sectional view of the mounting block 180 between two adjacent seals 169 (indicated as 169A, 169B). Although the components discussed herein primarily refer to a BOAS in the turbine section 28, the teachings herein can also be utilized for other components of the engine 20, such as one of the platforms 62, 72, 73, an upstream stage of the compressor section 24, or combustor panels or liners defining portions of a combustion chamber located in the combustor section 26.

Referring to FIGS. 3 and 4, each seal assembly 176 includes a seal 169 and at least one support or mounting block 180. Each seal 169 is arranged in close proximity to an airfoil tip 164 during operation of the engine. An array of the seals 169 is circumferentially distributed about axis A and about an array of blades or airfoils 161 to bound a core flow path C (three seals 169A-169C shown in FIG. 3 for illustrative purposes).

Each seal 169 includes an elongated main (or seal) body 170 that extends in a circumferential direction T between opposed (or first and second) mate faces 178 and extends in an axial direction X between a leading edge portion 193 and a trailing edge portion 194. The main body 170 can have a generally elongated and arcuate profile, as illustrated by FIGS. 4 and 5. The seal 169 includes a sealing portion 177 that extends circumferentially between the mate faces 178. The sealing portion 177 includes a front side or seal face 183 that extends circumferentially between the mate faces 178. The seal face 183 faces toward and bounds a gas path, such as the core flow path C, when the seal 169 is located in an installed position. The sealing portion 177 includes a backside or impingement face 189 that is opposite to the seal face 183.

Each seal 169 includes at least one engagement portion 179 that extends between the mate faces 178. Each engagement portion 179 can extend radially outward from the sealing portion 177 when in an installed position. The leading and trailing edge portions 193, 194 include the radially extending walls of the main body 170 along the sealing portion 177 and/or the engagement portion 179, with the walls spanning between the mate faces 178.

The seal 169 includes an internal cavity 184 defined by the main body 170 that extends inwardly from at least one or a pair of openings 185 along each of the respective mate faces 178 (shown in FIG. 5). In the illustrated example of FIGS. 3-8, the internal cavity 184 extends circumferentially between the mate faces 178 and is defined in the main body 170 between the sealing portion 177 and the engagement portion 179.

Various materials can be utilized to manufacture the seal 169 and mounting block 180. In some examples, the seal 169 is made of a first material, and the mounting block 180 is made of a second, different material. For example, the first material can include a ceramic or ceramic matrix composite (CMC) material. The seal 169 can be formed from one or more layers L of a CMC layup including fibers impregnated with resin (FIG. 4). The seal 169 can be made of another material, such as a high temperature metal, alloy, or composite material. The mounting block 180 can be made of a second material such as a high temperature composite, metal, or alloy, such as a nickel-based superalloy, for example. The first and second materials can differ. In other examples, the seal 169 is made of a first material, and the mounting block 180 is made of a second material that is the same as the first material, including any of the materials disclosed herein. The seal 169 is formed to have a unitary construction. In alternative examples, the sealing portion 177 and each engagement portion 179 are separate and distinct components that are mechanically attached to one another with one or more fasteners.

Referring to FIGS. 7 and 8, the mounting block 180 can be arranged to secure one or more of the seals 169 to a housing such as engine case 137, or to another portion of engine static structure 136. An adjacent pair of seals 169 are indicated as seals 169A, 169B in FIG. 8. The mounting block 180 includes at least one interface portion 181 extending outwardly from a main body or mounting portion 182. In the illustrated example of FIGS. 7 and 8, the mounting block 180 includes a pair of opposed interface portions 181A, 181B that extend outwardly from the mounting portion 182. Each interface portion 181 is dimensioned to abut the engagement portion 179 of the respective seal 169 to limit relative movement in the radial and/or circumferential directions R, T, for example.

A cross-section of the mounting block 180 can have a generally trapezoidal geometry, as illustrated by FIGS. 7 and 8. Surfaces of each interface portion 181 slope outwardly between a top 182A and bottom 182B of the mounting portion 182. The interface portions 181 can have a dovetail geometry. Each interface portion 181 can be inserted into or otherwise extend through a respective opening 185 to mate with ramped surfaces 186 of the internal cavity 184 (indicated as 186A, 186B in FIG. 8) along an interface to bound movement of the seal 169 relative to the mounting block 180. The dovetail geometry circumferentially overlaps with walls of the engagement portions 179A, 179B when in the installed position to secure adjacent pairs of the seals 169A, 169B to the engine case 137. Ends of the interface portions 181 can be contoured to guide the interface portions 181 through one of the openings 185 and into the respective internal cavity 184 during installation. The dovetail geometry and contouring can reduce mechanical stress on the seal 169, including seals made of a composite material which can be strong but relative brittle.

Each interface portion 181 can include an outwardly extending retention feature 187. The retention feature 187 is dimensioned to abut against surfaces of the engagement portion 179 to seat the seal 169 during assembly and limit circumferential and/or radial movement.

The mounting block 180 can be secured to the engine case 137 using one or more fasteners 190 (one shown in FIG. 8 for illustrative purposes). Each mounting portion 182 defines a bore 188 that receives a respective fastener 190 to mechanically attach or otherwise secure the mounting portion 182 to the housing or engine case 137 and limit relative movement of one or more seals 169. In the illustrated example of FIG. 8, the fastener 190 is a bolt, and the bore 188 threadably receives a length of the bolt. In alternative examples, the fastener 190 is a clip or another structure to secure the seal 169 to the engine static structure 136.

In the illustrated example of FIG. 8, the adjacent seals 169A, 169B are arranged in close proximity such that the respective mate faces 178A, 178B define an intersegment gap G (see also FIG. 3) that extends a distance in the circumferential direction T. The mounting block 180 is situated between the mate faces 178A, 178B such that the mounting block 180 spans across the intersegment gap G. The mounting block 180 is arranged between the engagement portions 179A, 179B and can circumferentially space apart the seals 169A, 169B. The interface portions 181 abut against the adjacent seals 169A, 169B to support the seals 169A, 169B relative to the engine case 137 and limit circumferential movement of the seals 169A, 169B relative to the engine axis A. Each mounting block 180 secures the engagement portions 179A, 179B to the engine case 137 when in the installed position. In alternative examples, the mounting block 180 is positioned at another location than along the intersegment gap G to secure the seal 169 to the engine case 137, such as a midspan of the seal 169.

Referring back to FIGS. 3-4, with continued reference to FIGS. 5-8, the seal assembly 176 defines a cooling arrangement 192 to deliver cooling flow F to portions of the seal 169 and/or other portions of the seal assembly 176 or components of the engine. The engine case 137 or another portion of the engine static structure 136 defines at least one or a plurality of cooling passages 139. The seal 169 is mounted to the engine case 137 such that the impingement face 189 is exposed to define one or more plenum(s) 174 that extend between the impingement face 189 and inner surfaces of the engine case 137. The cooling passages 139 are configured to communicate with and receive cooling flow from cooling source(s) 175.

Each of the cooling passages 139 defines a respective passage axis PA that is oriented such that a projection of the passage axis PA intersects the main body 170 of a respective one of the seals 169. The cooling passages 139 are oriented such that cooling flow F is ejected into the plenum(s) 174 in a direction along the passage axis PA and toward the main body 170 of the seal 169 such that the cooling flow F impinges on surfaces of the main body 170.

The seal 169 defines one or more apertures 191 to communicate cooling flow F to the internal cavity 184 to cool adjacent portions of the seal 169 during engine operation. In the illustrated example of FIGS. 3-8, the impingement face 189 defines the apertures 191 to the internal cavity 184. The apertures 191 can be distributed in one or more rows and columns in the axial and/or circumferential directions X, T, for example. One or more of the apertures 191 can be spaced apart from each end wall 195 of the engagement portion 179 that bounds the internal cavity 184. Each of the apertures 191 defines an aperture axis AA (FIG. 4) such that a projection of the aperture axis AA intersects a wall of the internal cavity 184. The apertures 191 are spaced from outlets of the cooling passages 139 and are substantially exposed and free of any obstructions when in an assembled position such that the apertures 191 communicate cooling flow F to the internal cavity 184 during engine operation. Cooling flow F communicated by the apertures 191 to the internal cavity 184 can reduce relatively sharp thermal gradients that may otherwise occur in the main body 170 due to a lack of active flow or cooling to the internal cavity 184. Reducing the thermal gradients can improve the durability of seals 169 comprising a ceramic or CMC material, for example.

The apertures 191 can be dimensioned to meter flow from the cooling source 175 into the internal cavity 184 at a desired rate and reduce inefficiencies due to excess cooling flow F that may otherwise be communicated from the cooling source 175 to provide localized cooling. The apertures 191 can have a generally elliptical profile and extend in a radial direction R through a thickness of a wall of the main body 170 defining the impingement face 189. Other geometries of the apertures 191 can be utilized, including rectangular or complex geometries. In examples, a sum of the cross-sectional area of all of the apertures 191 defined in the impingement face 189 is less than 50% of a total surface area of the impingement face 189, or more narrowly between 10% and 25% of the total surface area of the impingement face 189.

Each aperture 191 can be formed by a machining operation after forming the main body 170. Alternatively, each aperture 191 can be formed during the fabrication of the main body 170 by arranging the layers L of the CMC layup (FIG. 4), for example.

The apertures 191 can be arranged relative to the cooling passages 139 to provide localized cooling to selected portions of the seal 169. The projection of the passage axis PA of some cooling passages 139 can intersect the impingement face 189, but the projection of the passage axis PA of other cooling passages 139 may not. In the illustrative example of FIGS. 3 and 4, the projection of the passage axis PA of at least some of the cooling passages 139 can be aligned with or otherwise intersect a respective one of the apertures 191. In the illustrated example of FIG. 4, the projection of the passage axis PA of the cooling passage 139A intersects and is substantially collinear with the aperture axis AA of aperture 191A, thereby increasing the impingement distance between an outlet of the cooling passage 139A and localized surfaces of the internal cavity 184 that are intersected by the projection of the passage axis PA. The increased impingement distance can reduce the heat transfer correlation, which can reduce thermal gradients and more evenly distribute the cooling flow F in the radial direction R.

The projection of the passage axis PA of the cooling passage 139B intersects and is transverse to aperture axis AA of aperture 191B. The transverse arrangement of the aperture axis AA of aperture 191B relative to the passage axis PA of cooling passage 139B can target the cooling flow F to an inlet of the aperture 191B but can cause an increase in turbulence at the inlet to provide increased cooling to portions of the main body 170 that are adjacent to the aperture 191B prior to the cooling flow F circulating into the internal cavity 184. Some of the apertures 191 can be offset from a projection of the passage axis PA of the cooling passage 139, as illustrated by apertures 191C in FIG. 4. Aligning some of the cooling passages 139 with respective apertures 191 but offsetting other cooling passages 139 with respect to each of the apertures 191 can provide a mixture of localized, impingement cooling to surfaces of the impingement face 189 and localized, impingement cooling to surfaces of the internal cavity 184. In examples, each aperture 191 is aligned with a respective cooling passage 139. In other examples, each aperture 191 is offset from each cooling passage 139.

The mounting blocks 180 can be exposed to relatively hot gases in the core flow path C adjacent to the intersegment gaps G. In the illustrated example of FIGS. 3 and 8, the seal 169 includes one or more apertures 191 defined in the impingement face 189 along the engagement portion 179. The apertures 191 are defined such that a projection of the aperture axis AA of the of apertures 191 intersect surfaces of the mounting block 180 along the interface between the mounting block 180 and the main body 170 when in the installed position. The projection of the passage axis PA of one or more of the cooling passages 139 can intersect a respective one of the apertures 191 that is defined along the interface between the mounting block 180 and the main body 170. The axes PA, AA of the respective cooling passage 139 and aperture 191 can be substantially aligned or collinear, or the axes PA, AA can be transverse to each other, such that cooling flow F is ejected from the cooling passage 139, through the respective aperture 191, and impinges on adjacent surfaces of the mounting block 180 to provide localized cooling. The localized cooling can reduce thermal gradients in the seal 169 and increase durability.

A method of sealing is as follows. With reference to FIG. 8, a mounting block 180 is positioned between mate faces 178A, 178B of each adjacent pair of seals 169A, 169B. Each of the interface portions 181A, 181B is inserted or otherwise moved in a circumferential direction T through a respective one of the openings 185A, 185B and into abutment with the ramp surfaces 186A, 186B of the engagement portions 179A, 179B to bound movement of the seals 169A, 169B. The fastener 190 is mechanically attached or otherwise secured to the mounting block 180. The mounting block 180 is secured to the engine static structure 136 such that the mounting block 180 is positioned along one of the intersegment gaps G.

Referring to FIGS. 3-4, with continued reference to FIG. 8, during operation of the engine, pressurized cooling flow F is communicated from the cooling source 175 to the cooling passages 139. The cooling passages 139 eject the cooling flow F into the plenum 174 and in a direction toward the impingement face 189 of the seal 169. The cooling flow F can be ejected or otherwise discharged from the cooling passages 139 at a predetermined pressure and velocity such that the cooling flow F impinges on localized surfaces of the main body 170. The cooling passages 139 and apertures 191 can be defined such that the cooling flow F impinges on surfaces of the impingement face 189, the mounting block 180 and/or the internal cavity 184 to provide localized cooling. The cooling flow F circulates from the plenum 174 and into the apertures(s) 191. The cooling flow F circulates from the apertures(s) 191 and disperses into the internal cavity 184 to cool portions of the seal 169.

The mounting block 180 can be dimensioned relative to surfaces of the internal cavity 184 such that cooling flow F in the internal cavity 184 can exit the openings 185 along the mate faces 178 and into the intersegment gaps G (see FIG. 8). Communication of the cooling flow F can cool portions of the mate faces 178, thereby improving durability of the seals 169. Communicating the cooling flow F into each intersegment gap G also causes a sealing relationship to be formed, which can reduce a likelihood of ingestion of hot combustion gases from the core flow path C and into the intersegment gap G. In examples, the sealing portion 177 can define one or more film cooling holes 196 (shown in dashed lines in FIG. 8) to eject cooling flow F from the internal cavity 184 into the core flow path C.

Figure 9:
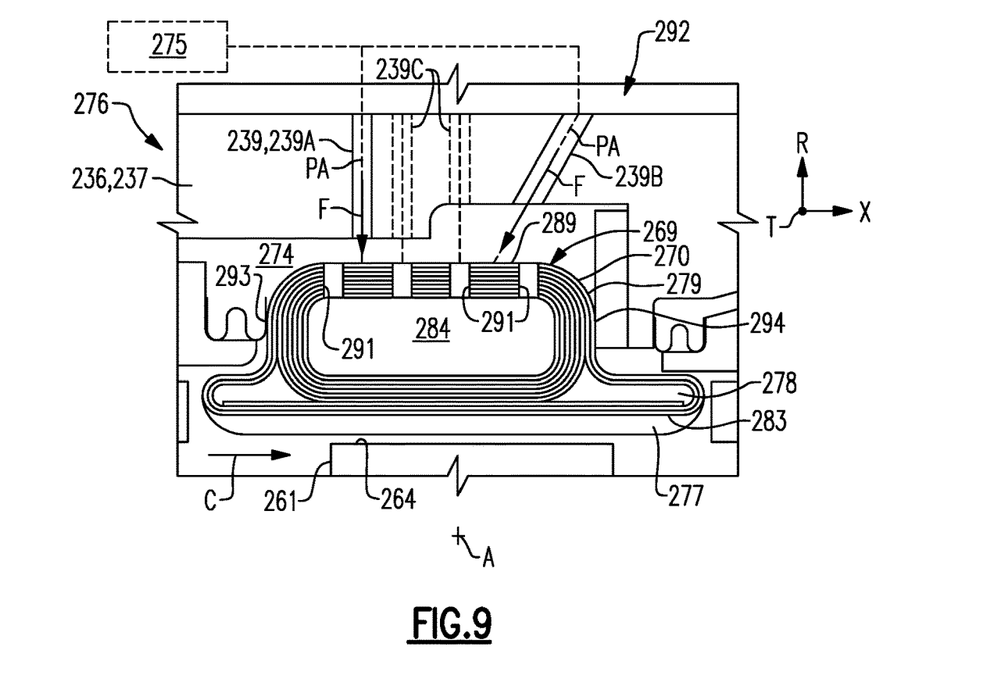
FIG. 9 illustrates a sectional view of a seal assembly according to another example.

FIG. 9 illustrates a seal assembly 276 according to another example. A housing or engine case 237 defines a plurality of cooling passages 239. A projection of the passage axis PA of at least some of the cooling passages 239 intersects impingement face 289 to provide localized impingement cooling to portions of main body 270 adjacent to the impingement face 289.

Intersection of the projection of the passage axis PA along the impingement face 289 reduces the impingement distance between an outlet of the cooling passage 239 and surfaces of the seal 269. The reduced impingement distance can provide targeted cooling to localized surfaces of the seal 269 and can increase the thermal gradient to more closely match the thermal profiles of adjacent portions of the seal 269. Each passage axis PA can be perpendicular or transverse to the impingement face 289 at the point of intersection (see, e.g., passages 239A and 239B, respectively). The points of intersection are spaced apart a distance from adjacent apertures 291 to allow the cooling flow F to follow along surfaces of the impingement face 289 prior to entry into the adjacent apertures 291 to cool adjacent portions of the seal 269 prior to flowing into the internal cavity 284.

In the illustrated example of FIG. 9, the projection of each passage axis PA intersects the impingement face 289. In some examples, the projection of one or more of the cooling passages 239 is aligned with or otherwise intersects the apertures 291, such as cooling passages 239C (shown in dashed lines). In other examples, each of the cooling passages 239 is aligned with or otherwise intersects a respective one of the apertures 291.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a gas turbine engine comprising:
a seal including a seal body having a sealing portion that extends from an engagement portion, the sealing portion including a seal face that extends circumferentially between first and second mate faces, the seal body defining an internal cavity that extends circumferentially between the first and second mate faces, and the engagement portion including an impingement face opposite the seal face that defines a plurality of apertures to the internal cavity, wherein the internal cavity extends from a first opening along the first mate face to a second opening along the second mate face; and
a housing mounted to the seal such that the impingement face is exposed to define a plenum between the housing and the impingement face, the housing defining a plurality of cooling passages, and each of the plurality of cooling passages defining a passage axis that is oriented such that a projection of the passage axis intersects the seal body;
a mounting block including an interface portion extending from a mounting portion, the interface portion abutting the engagement portion along an interface to limit relative movement, and the mounting portion mechanically attached to the housing; and
wherein the projection of the passage axis of at least some of the plurality of cooling passages intersects a respective one of the plurality of aptures that is defined along the interface.

2. The seal assembly as recited in claim 1, wherein the seal is made of a first material including a ceramic material, and the seal has a unitary construction.

3. The seal assembly as recited in claim 1, wherein the projection of the passage axis of at least some of the plurality of cooling passages intersects the impingement face.

4. The seal assembly as recited in claim 3, wherein the projection of the passage axis of other passages of the plurality of cooling passages intersects a respective one of the plurality of apertures at a position circumferentially inward if the interface.

5. The seal assembly as recited in claim 1, wherein the interface portion has a dovetail geometry that extends through the first opening to mate with ramped surfaces of the internal cavity and bound movement of the seal relative to the mounting block.

6. The seal assembly as recited in claim 5, wherein the mounting block is a first mounting block and a second mounting block, and the interface portion of the first mounting block is received in the first opening and the interface portion of the second mounting block received in the second opening to secure the seal to the engine case.

7. The seal assembly as recited in, wherein the seal is made of a first material including a ceramic material, and the mounting block is made of a second, different material.

8. The seal assembly as recited in claim 1, wherein the seal is made of a first material including a ceramic material, and the mounting block is made of a second material that is the same as the first material.

9. The seal assembly as recited in claim 1, wherein the seal is a blade outer air seal (BOAS).

10. A gas turbine engine comprising:
an engine case extending along an engine axis;
an array of blades rotatable about the engine axis; and
an array of blade outer air seals distributed about the array of blades to bound a core flow path, wherein each of the seals comprises:
an elongated seal body including a seal face that faces toward the core flow path and an opposed impingement face;
wherein the seal body defines an internal cavity that extends circumferentially between opposed mate faces, and the seal body defines a plurality of apertures to the internal cavity along the impingement face; and
wherein the seal is mounted to the engine case such that the impingement face is exposed;
wherein the engine case defines a plurality of cooling passages spaced apart from the impingement face, and each of the plurality of cooling passages defines a passage axis that is oriented such that a projection of the passage axis intersects the seal body of a respective one of the seals; and
an array of circumferentially spaces apart mounting blocks, wherein the mate faces of adjacent seals of the array of seals are arranged to a plurality of intersegment gaps, each of the mounting blocks is arranged along a respective one of the plurality of intersegment gaps and engages surfaces of the respective internal cavity of the adjacent seals, and each of the mounting blocks is mechanically attached to the engine case to limit movement of the respective adjacent seals relative to the engine case;

wherein the projection of the passage axis of at least some passages of the plurality of cooling passages intersects a respective one of the plurality of apertures; and wherein the projection of the passage axis of one or more of the plurality of cooling passages intersects a respective one of the plurality of apertures that is defined along an interface between a respective mounting block of the array of mounting blocks and the seal body.

11. The gas turbine engine as recited in claim 10, wherein: the projection of the passage axis of other passages of the plurality of cooling passages intersects the impingement face.

12. A method of sealing of a gas turbine engine, comprising:
   securing a mounting block to an engine static structure such that the mounting block is positioned along an intersegment gap between mate faces of adjacent blade outer air seals;
   wherein each of the adjacent blade outer air seals comprises:
      an elongated seal body including a seal face that faces toward a gas path and an opposed impingement face; and
      wherein the seal body defines an internal cavity that extends circumferentially between opposed mate faces and defines a plurality of apertures to the internal cavity along the impingement face;
   wherein the engine static structure defines a plurality of cooling passages, and each of the plurality of cooling passages defines a passage axis that is oriented such that a projection of the passage axis intersects the seal body of a respective one of the adjacent seals; and
   ejecting cooling flow from the plurality of cooling passages such that the cooling flow impinges on surfaces of the seal body;
   wherein the projection of the passage axis of at least some passages of the plurality of cooling passages intersects a respective one of the plurality of apertures; and
   wherein the projection of the passage axis of one or more of the plurality of cooling passages intersects a respective one of the plurality of apertures that is defined along an interface between the mounting bock and the seal body.

13. The method as recited in claim 12, wherein the projection of the passage axis of at least some passages of the plurality of cooling passages intersects the impingement face.

14. The seal assembly as recited in claim 4, wherein the seal is made of a first material including a ceramic material, and the seal has a unitary construction.

15. The seal assembly as recited in claim 14, wherein the seal is formed from one or more layers of a ceramic matrix composite layup.

16. The seal assembly as recited in claim 14, wherein a sum of a cross-sectional area of all of the apertures defined in the impingement face, inclusive of the plurality of apertures, is between 10% and 25% of a total surface area of the impingement face.

17. The gas turbine engine as recited in claim 10, wherein the internal cavity extends from a first opening along one of the mate faces to a second opening along another one of the mate faces.

18. The gas turbine engine as recited in claim 17, wherein:
   each mounting block of the array of mounting includes an interface portion extending from a mounting portion, the interface portion abutting the seal body of a respective one of the blade outer air seals along the interface to limit relative movement, and the mounting portion is mechanically attached to the engine case; and
   the interface portion has a dovetail geometry that extends through one of the first and second openings to mate with ramped surfaces of the internal cavity and bound movement of the respective blade outer air seals relative to the mounting block.

* * * * *